INVENTOR
ROBERT F. WHITE
BY Stanley Wolder
ATTORNEY

COMMUNICATION NETWORK

Filed July 19, 1960

2 Sheets-Sheet 2

INVENTOR
ROBERT F. WHITE
BY Stanley Wolder
ATTORNEY 3,190,959
COMMUNICATION NETWORK Robert F. White, New York, N.Y., assignor to Tele-Sessions, Inc., New York, N.Y., a corporation of New York Filed July 19, 1960, Ser. No. 43,836
8 Claims. (Cl. 179—1)

Figure 1:
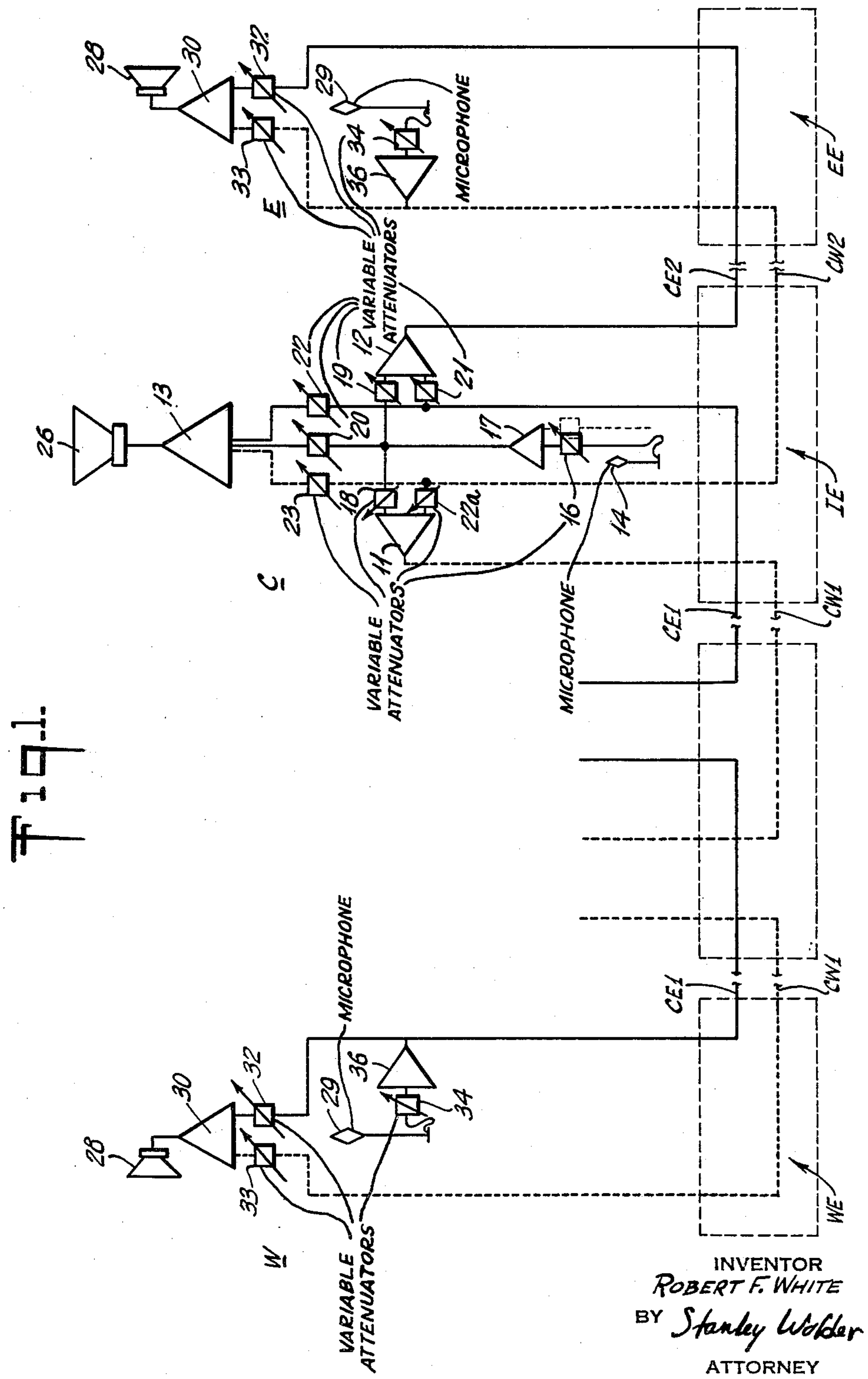

The present invention relates to improved communication systems in general, and it relates more particularly to improved communication systems for networking closed-circuit programs and broadcast programs which originate at a plurality of widely separated stations, and which alternately or simultaneously transmit while continuing to receive during the program, without the operation of switches or other controls and without prearrangement of the transmitting or receiving sequence.

The systems heretofore employed and proposed for effecting simultaneous intercommunication among a plurality of remotely spaced stations or points possess numerous drawbacks and disadvantages and at their best leave much to be desired. While their performance at relatively short distances is somewhat satisfactory, where the stations are widely separated difficulties are introduced which so adversely affect the performance of these systems as to greatly limit their use. In many of these multistation network systems it is necessary that signals are transmitted from the various stations in accordance with a predetermined sequence and that the switching operations be accordingly programmed. However, under many conditions, the necessity of prearranging the transmissions from the various stations is untenable rendering these systems practically useless in many cases. This is particularly true in the case of press conferences and auctions for example; or in the case of contests which require that talkers at each station be provided with the opportunity of speaking without prearrangement. Arrangements which require transmission to take place in a prearranged sequence, or which fail to provide continuous reception of the other stations while a given station is transmitting, are not capable of performing the functions of the present invention.

The conventional system generally employed for permitting simultaneous communicating among a plurality includes a master or control station which continuously receives signals from the other remotely spaced subscriber stations by way of individual channels or lines connecting each of the respective subscriber stations to the master station. The various signals received by the master station are mixed with a locally generated signal and the total mixed signal transmitted by way of a common network channel to the various subscriber stations where the network signal is amplified and transduced in the usual manner. This system possesses some major drawbacks. In addition to the common network channel, an additional channel is required for each subscriber station connecting it to the master station. This is particularly undesirable and highly expensive when the subscriber stations are numerous and spaced great distances from the master station.

A further important drawback of the aforesaid system, particularly where great distances are involved, is the inferior performance thereof by reason of the presence of what is known in the art as an echo. It has been observed that when the stations are widely separated the round trip transmission time which elapses betwen the moment when a talker at a distant station speaks and when his voice is returned on the network overall channel is so great that the talker no longer perceives the return transduced signal from his loudspeaker as a form of side tone, but rather perceives it as a distinctly separate sound or echo. This effect is further aggravated when the talker is some distance from the loudspeaker (as in an auditorium audience situation), and a considerable sonic transmission interval is combined with the electrical transmission delay. When this delay approaches approximately 25 to 50 milli-seconds, many individuals experience great difficulty in continuing to talk. This psychological effect is attributable to the fact that many individuals cannot distinguish the reproduced sound of their own audio signal from the reproduction of audio signals caused by talkers at other stations; and therefore, upon hearing the delayed reproduction of their initial utterance, they often receive the impression that a distant talker is trying to interrupt them and stop talking to listen. Talkers who are not expecting this to occur can become severely confused, and even those who have a technical understanding of what is happening find the ability to carry on a conversation severely impaired. This is a great disadvantage on programs where conference communications are desired and where it is desirable that talkers be able to interrupt each other or be aware that two talkers have spoken or are speaking at the same moment (as for example two bidders shouting at the same moment in an auction).

While there have been many attempts to eliminate or minimize the echo in multistation communication systems of the above type, the results have been of little practical success since they have resulted in systems which were highly complex and required closely attended switching operations.

It is therefore a principal object of the present invention to provide an improved communication system.

Another object of the present invention is to provide an improved system permitting simultaneous common communication among a plurality of remotely spaced stations.

Still another object of the present invention is to provide an improved system permitting simultaneous common communication among a plurality of remotely spaced stations and characterized by the substantial absence of any echos.

A further object of the present invention is to provide an improved system permitting simultaneous common communication among a plurality of remotely spaced stations without the necessity of any switching operations.

Still a further object of the present invention is to provide an improved communications system of the above nature wherein the number and lengths of interconnecting channels are greatly minimized.

Another object of the present invention is to provide a communications system of the above nature wherein additional stations may be readily and easily added.

Still another object of the present invention is to provide a communications system of the above nature characterized by its ruggedness, low cost, ease of operation and quality of performance.

Figure 2:
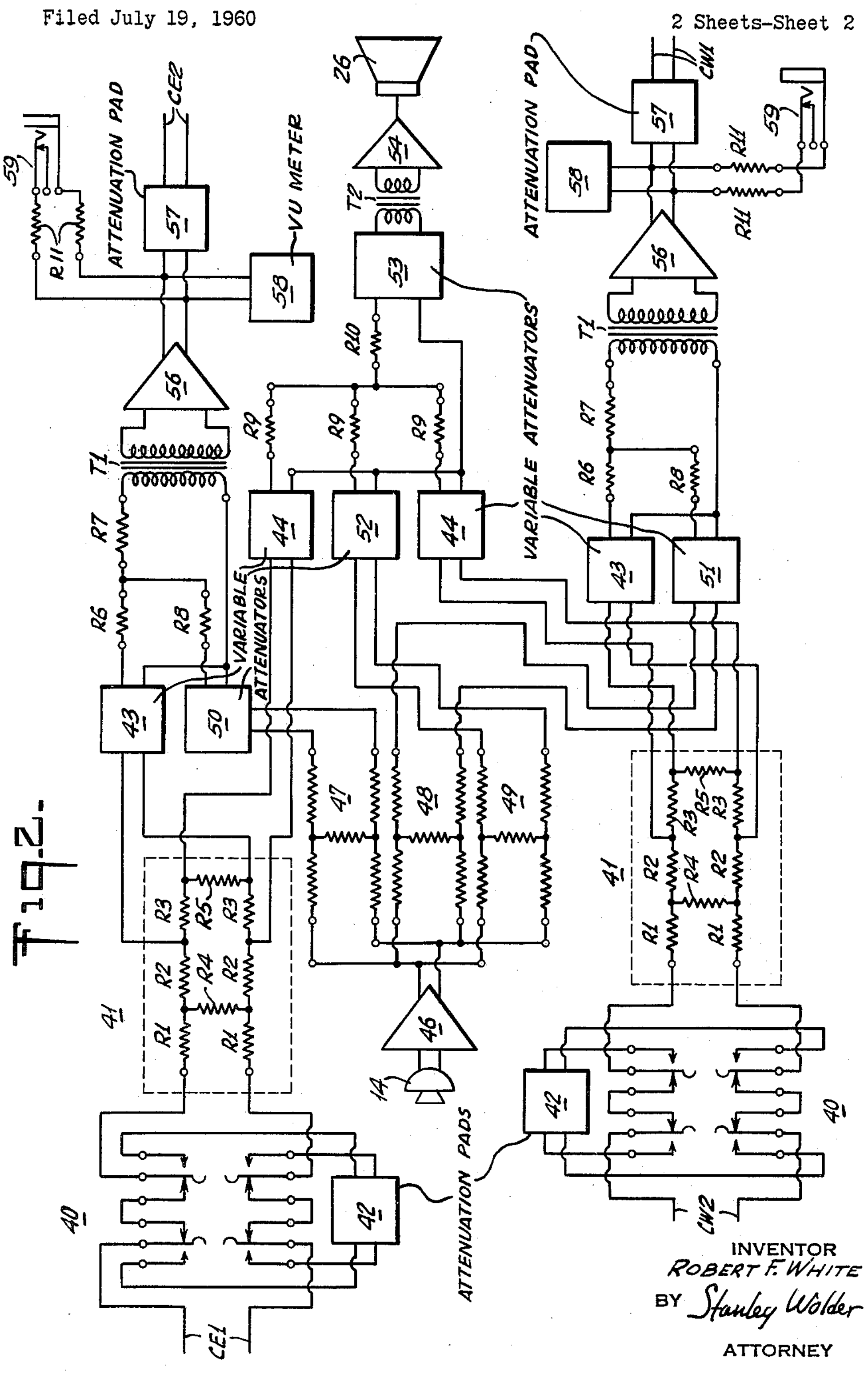

The above and other objects of the present invention will become apparent from a reading of the following description taken in conjunction with the accompanying drawings wherein:

FIGURE 1 is a schematic block diagram of a communications system embodying the present invention; and FIGURE 2 is a schmatic circuit diagram of an intermediate station which may advantageously be employed in the present improved communications system.

The multistation communications system of the present invention is characterized by the absence of any echo without the need of any switching arrangement, and with the employment of a minimum of communication channels, only a pair of incoming channels and a pair of outgoing channels at each intermediate station and only a pair of channels at the terminating stations. An important feature of the present communications system resides in the provision of a plurality of remotely separated stations, each including a local mixer network and a local signal generator. At each station the signals originating at the other stations are mixed with the locally generated signal by the local mixer network and the combined signals may then be transduced in the usual manner. Another important feature of the present system is the provision at each of the intermediate stations of mixer networks which receive a signal from a trailing station, mixes it with the locally generated signal and transmits it to a leading station and receives a signal from a leading station, mixes it with the locally generated signal and transmits it to the trailing station. Thus, each intermediate station includes two incoming and two out-going channels. While in the system hereinafter described as a preferred form of the present invention, each of the channels is in the form of a pair of conductors which pass through corresponding test room exchanges, the channels may take any known form and may be carried on common lines. For example they may be transmitted as separate bands on a common cable, may be transmitted as modulated radio frequency carriers or the like.

The present invention in one sense differs from former methods in that at no point in the channels between stations or test room exchanges does any channel contain the total program content. The content of any channel existing between test room exchanges is unique when compared to the content of other channels; however, if the content of any two channels existent between the same test room exchanges would be combined the total program would result. The possibility of deriving the total program by the addition of any two channels existing between test room exchanges is an improvement over former systems in that it permits the addition of other stations which are enabled to both transmit and receive, without the employment of additional channels between test room exchanges. A further advantage of transmitting the sum of the total program via two channels, with neither channel containing the complete signal, is that doing so makes possible the separation of the functions of mixing the program for the local audience from the function of mixing signals for en route transmission for the stations.

The fact that each en route station's own signals are immediately added to the bi-directional transmission of the program en route, makes it possible to combine the overall program for the local audience and for any local participants, from sources that are free of any delayed echo return, since the local talker's voice is not obliged to travel many miles in order to be added to the program.

A further advantage of the present system is that by monitoring of the eastbound and westbound (or equivalents) signals at the terminus stations it is possible to detect any breaks in the transmission of signals through the en route stations. There are certain types of programs such as auctions or contests where it is essential that all participants have an equal opportunity to participate in the program, and that in the event of a failure to any one of the stations, such failure be detected immediately and the program halted until transmission to all participants is restored. An advantage of the present system over the prior systems is that channel failures in the entire system (inclusive of channels between test rooms and stations as well as between the test rooms) can be detected by merely monitoring the incoming channel at terminus stations.

Referring now to the drawings which illustrate a preferred embodiment of the present invention, the improved communications system includes a pair of terminal stations W and E and one or more intermediate stations C which may be of identical construction. Associated with each of the stations in the usual manner are test room exchanges WE, IE, and EE respectively, each of the intermediate exchanges being connected to the next trailing exchange by a pair of east-bound and west-bound channels CE1 and CW1 and to the next leading exchange by a pair of east-bound and west-bound channels CE2 and CW2. It should be noted that the terminal stations WE and EE are each provided with only one pair of east-bound and west-bound channels and that the channels CE1 and CW1 of one exchange corresponds to channels CE2 and CW2 of the next succeeding exchange and vice-versa.

Located at each of the intermediate stations C are first, second and third signal mixing networks 11, 12 and 13 which may be of any well known type and include audio amplifiers. Also disposed at the station C is a microphone or other signal generating transducer 14 which is connected by way of a variable attenuator 16 to the input of an audio amplifier 17. The output of the audio amplifier 17 is connected to the input of the mixer network 11 by way of a variable attenuator 18, to the mixer network 12 by way of a variable attenuator 19 and to the mixer network 13 by way of a variable attenuator 20. The channel CE1 is connected through the exchange IE to the inputs of mixer networks 12 and 13 by way of variable attenuators 21 and 22 respectively and the channel CW2 is connected through the exchange IE to the mixer networks 11 and 13 by way of variable attenuators **22*a* and 23** respectively.

The output of the mixer network 11 is connected through the exchange IE to channel CW1 and the output of the mixer network 12 is connected through the exchange IE to the channel CE2. The network 13 has associated therewith an audio power amplifier the output of which drives a loudspeaker 26. The loudspeaker 26 and the microphone 14 are acoustically isolated from each other in any well known manner to prevent acoustic feed back. For example the microphone 14 and speaker 26 may be of the directional types and suitably located and oriented.

Each of the terminal stations W and E likewise includes a loudspeaker 28 and a microphone 29 which are acoustically isolated from each other. The loudspeaker 28 is connected to the output of a power amplifier and signal mixing network 30 to the input of which are connected the channels CE and CW by way of variable attenuators 32 and 33 respectively. In station W the microphone 29 is connected through a variable attenuator 34 and an amplifier 36 to the channel CE and in station E the microphone 29 is connected through a variable attenuator 34 and an amplifier 36 to the channel CW.

In the operation of the improved communications system described above a signal generated at the terminal station W by the microphone 29 is delivered at the desired level by way of the variable attenuator 34 and amplifier 36 to the channel CE and to the mixer amplifier by way of the variable attenuator 32. Also delivered to the mixer amplifier 30 through variable attenuator 33 is the aggregate signal from the other stations by way of channel CW. Thus the signal delivered to the loudspeaker is the sum of the locally generated undelayed signal and the signals originating at all the other stations. The terminal station W operates in a like manner. At each of the intermediate stations C the local mixer network 11 receives the aggregate of the signals generated at the leading stations eastwardly thereof by way of channel CW2 and mixes it with the signal locally generated by the microphone 14 and transmits these by way of channel CW1 to the next succeeding trailing station. Similarly, the mixer network 12 receives the aggregate of the signals generated at the trailing stations, westwardly thereof by way of the channel CE1 and mixes it with the locally generated signal and transmits these by way of channel CE2 to the next succeeding leading station. Furthermore, the aggregate signals received from the leading and trailing stations by way of channels CW2 and CE1 are mixed with the locally generated signal by the network 13 and locally enunciated by speaker 26.

It is apparent from the above, as has been earlier set forth, that at each of the stations the signals from all of the stations are received, mixed locally with the locally generated signal and transduced. Inasmuch as there is no delay of the locally generated signal, no echo whatsoever is experienced. Moreover, the number of channels which connects any two stations is always only two in number and is independent of the number of stations. Furthermore, the signals appearing on any of the channels between any pair of stations is different from the signals on any other channel. It is important to note that the signals in any pair of channels connecting successive stations contains the signals generated at all the stations, no signal appearing on both channels. As a consequence, an additional intermediate station may be simply hooked into any pair of channels, in the manner set forth above, without interfering with the operation of the overall system. The added intermediate station may or may not introduce another locally generated signal as desired. The various variable attenuators permit the adjustment of the signals to their optimum levels.

In FIGURE 2 of the drawings there is illustrated a circuit network of an intermediate station which may be advantageously employed in the present system and includes the microphone 14 and loudspeaker 26 and has incoming channel cables CE1 and CW2 and outgoing channel cables CE2 and CW1. Each of the channels CE1 and CW2 are connected by way of a four pole double throw switch 40 to the input of a signal dividing attenuation pad 41, the switch 40 permitting the insertion of an attenuation pad 42 into the line where the lines are at a standard low level. The inlet terminals of the pad 42 are connected to one pair of the normally open switch contacts and the output terminals thereof to the other pair of the normally open switch contacts. Opposite normally closed switch contacts are interconnected and one pair of switch arms is connected to the incoming channel and the other pair is connected to the input of the pad 41. Thus, the incoming channel is normally connected directly to the pad 41 and is connected thereto by way of the pad 42 upon throwing of the switch 40 for high level line operation.

The pad 41 includes opposite pairs of series connected resistors R1, R2 and R3, the R1–R2 junctions being bridged by a resistor R4 and the R3 termini being bridged by a resistor R5. The attenuated outputs of the pads 41 are taken from the opposite R2–R3 and R3–R5 junctions are connected to the inputs of variable attenuators 43 and 44.

The microphone 14 is connected to the input of an amplifier 46 the output of which is connected by way of resistor H-pads 47, 48 and 49 to the inputs of variable attenuators 50, 51 and 52 respectively. The outputs of the variable attenautors 43 are connected to the inputs of respective transformers T1 by way of resistors R6 and R7 and the outputs of the variable attenuators 50 and 51 are connected to the inputs of transformers T1 by way of resistors R8 and R7. The outputs of the variable attenuators 44 and 52 are connected through corresponding resistors R9 and a common resistor R10 to the input of a variable attenuator 53. The output of the attenuator 53 is connected by way of a transformer T2 to the input of a suitable audio amplifier 54 the output of which is connected to the loudspeaker 26.

The outputs of the transformers T1 are connected to the inputs of amplifiers 56 the outputs of which are connected through attenuating pads 57 to the outgoing channels CE2 and CW1 respectively. Also connected to the outputs of each of the amplifiers 56 is a v.u. meter network and a headset monitoring jack 59 by way of pairs of resistors R11.

The following are examples of the values of the various components which may be employed in the network above described: R1, R2—67 ohms; R3, R5—600 ohms; R4—1260 ohms; R6, R7, R8—200 ohms; R9, R10—300 ohms; R11—2000 ohms. The attenuation at midpoint of variable attenuators 43, 50, 51 is 20 db, and that of variable attenuators 44, 52 and 53 is 10 db. The attenuation of attenuator pad 42 is 10 db, of pad 41 is 10 db, and of pad 57 is 6 db.

Under normal operating conditions the level of the signals entering the pad 41 is about —20 v.u. and entering the attenuators 43, 44, 50, 51 and 52 about —30 v.u. The output of amplifier 46 is about 8 v.u. which is attenuated by H-pads 47, 48 and 49 to —30 v.u. The loss in resistors R6, R7 and R8 is about 6 db feeding a signal at about —56 v.u. to amplifiers 56 which amplifies it to about 14 v.u., the signal then being attenuated by pads 57 to 8 v.u. and fed to outgoing channels CE2 and CW1. The signal level at the input to attenuator 53 is about —50 v.u. and to transformer T2 about —60 v.u. It should be noted that the above values are given merely by way of example and may be adjusted and varied according to the operating conditions in any manner well known in the art.

The operation of the last described network in the present system is apparent from the above and requires no further explanation.

While there has been described and illustrated a preferred embodiment of the present invention, it is obvious that numerous alterations, omissions and additions may be made without departing from the spirit thereof.

What is claimed is:

1. A network for providing substantially simultaneous multidirectional communication among a plurality of remotely separated stations including a signal transmitting and receiving leading station, a signal transmitting and receiving trailing station and a signal receiving and transmitting intermediate station, a first pair of incoming and outgoing channels connecting said intermediate station with said trailing station and a second pair of incoming and outgoing channels connecting said intermediate station with said leading station, a local signal generator disposed at said intermediate station; a first network at said intermediate station mixing the locally generated signal with the signal received from said first incoming channel and transmitting the combined signals along said second outgoing channel, a second network at said intermediate station mixing said signal received from said second incoming channel with said locally generated signal and transmitting the combined signals along said first outgoing channel, a third network located at said intermediate station mixing said locally generated signal with said signals from said first and second incoming channels, and an electroaudio transducer connected to the output of said third mixer network.

2. A communications network in accordance with claim 1, including a first signal dividing network connected between said first incoming channel and said first and third mixer networks and a second signal dividing network connected between said second incoming channel and said second and third mixer networks.

3. A communications network in accordance with claim 1 including first variable attenuators connected between each of said incoming channels and said first and second mixer networks, respectively, second variable attenuators connected between said signal generator and said first and second mixer networks respectively and third variable attenuators connected between said third mixer network and said first and second incoming channels and said generator respectively.

4. A network for providing substantially simultaneous multidirectional communication among a plurality of remotely separated stations including an intermediate station, a trailing station and a leading station, comprising first and second communication means connecting said intermediate station and said trailing station and third and fourth communication means connecting said intermediate station and said leading station, a signal generating device located at said intermediate station, a first mixer network having an input coupled to said first communication means and said signal generating device and an output coupled to said third communication means, a second mixer network located at said intermediate station and having an input coupled to said signal generating device and said fourth communication means and an output coupled to said second communication means, and a third mixer network located at said intermediate station and having an input coupled to said signal generating device and said first and fourth communication means.

5. A communications network in accordance with claim 4 including an electroaudio transducer connected to the output of said third mixer network.

6. A communications network in accordance with claim 4 wherein said signal generating device includes a microphone.

7. A communications network in accordance with claim 6 including a loudspeaker connected to the output of said third mixer network, said microphone and said loudspeaker being substantially acoustically isolated from each other.

8. A communications network including a signal transmitting and receiving leading station, a signal transmitting and receiving trailing station and a signal and transmitting intermediate station, a first pair of incoming and outgoing channels connecting said intermediate station with said trailing station and a second pair of incoming and outgoing channels connecting said intermediate station with said leading station, a local signal generator disposed at said intermediate station, a first network at said intermediate station mixing the locally generated signal with the signal received from said first incoming channel and transmitting the combined signals along said second outgoing channel, a second network at said intermediate station mixing said signal received from said second incoming channel with said locally generated signal and transmitting the combined signals along said first outgoing channel, first variable attenuators connected between each of said incoming channels and said first and second mixer networks respectively, and second variable attenuators connected between said signal generator and said first and second mixer networks respectively.

References Cited by the Examiner

UNITED STATES PATENTS

| | | | |
|---|---|---|---|
| 2,296,626 | 9/42 | Blumlein | 179—1 |
| 2,395,540 | 2/46 | Edwards | 179—170 |
| 2,427,496 | 9/47 | Feldscher | 179—1 |
| 2,515,726 | 7/50 | Montani | 179—1 |
| 2,759,999 | 8/56 | Foster et al. | 179—1 |
| 2,871,291 | 1/59 | Horner | 179—1 |
| 3,054,859 | 9/62 | Brown | 179—170 |

ROBERT H. ROSE, *Primary Examiner.*

L. MILLER ANDRUS, THOMAS B. HABECKER, *Examiners.*